US012722785B1

(12) United States Patent
Jones et al.

(10) Patent No.: US 12,722,785 B1
(45) Date of Patent: Sep. 1, 2026

(54) AIRPLANE PASSENGER PARACHUTE SYSTEM

(71) Applicants: James Jones, Atlanta, GA (US); Kim Jones, Atlanta, GA (US)

(72) Inventors: James Jones, Atlanta, GA (US); Kim Jones, Atlanta, GA (US)

(*) Notice: Subject to any disclaimer, the term of this patent is extended or adjusted under 35 U.S.C. 154(b) by 0 days.

(21) Appl. No.: 19/044,933

(22) Filed: Feb. 4, 2025

(51) Int. Cl.
*B64D 25/10* (2006.01)
*B64C 1/14* (2006.01)
*B64D 11/06* (2006.01)
*B64D 17/70* (2006.01)

(52) U.S. Cl.
CPC ............ *B64D 25/10* (2013.01); *B64C 1/1461* (2013.01); *B64D 11/0612* (2014.12); *B64D 11/062* (2014.12); *B64D 11/0633* (2014.12); *B64D 11/0648* (2014.12); *B64D 17/70* (2013.01)

(58) Field of Classification Search
CPC .... B64D 25/10; B64D 11/0633; B64D 17/70; B64D 17/00; B64C 1/143; B64C 1/1407
See application file for complete search history.

(56) References Cited

U.S. PATENT DOCUMENTS 2,684,219 A * 7/1954 Thunbo .................. B64D 25/12 244/140
5,031,863 A * 7/1991 Noble .................. B64C 1/1407 D12/345
5,063,879 A * 11/1991 Vorbau .................. B64D 25/06 119/857
D358,577 S 5/1995 Sutter
5,979,829 A 11/1999 Nance
6,382,563 B1 5/2002 Chiu
6,682,017 B1 1/2004 Giannakopoulos
11,518,529 B2 12/2022 Lee
2009/0212160 A1 8/2009 Beauchamp
2011/0233341 A1 9/2011 Monteforte
2016/0083095 A1* 3/2016 Joffre .................... B64D 25/06 244/122 B
2023/0142872 A1* 5/2023 Alfadil .................. B64D 11/00 244/122 AE
2025/0108932 A1* 4/2025 Hegenbart ............ B64D 37/12

FOREIGN PATENT DOCUMENTS

CA 2403158 6/2007

* cited by examiner

*Primary Examiner* — Joshua J Michener
*Assistant Examiner* — Cindi M Curry
(74) *Attorney, Agent, or Firm* — Kyle A. Fletcher, Esq.

(57) ABSTRACT

The airplane passenger parachute system includes an aircraft, a plurality of swing-up doors, a plurality of seat pallets, a plurality of tracks, and an activation control. The airplane passenger parachute system may be a safety feature adapted to evacuate a plurality of passengers from the aircraft after the aircraft has been determined to be unsafe to land. Responsive to actuating the activation control, the plurality of swing-up doors may open and the plurality of seat pallets comprising a plurality of passenger seats may be shifted from the aircraft by forcing the plurality of seat pallets out of the aircraft on the plurality of tracks. A parachute coupled to each of the plurality of seat pallets may deploy and the plurality of seat pallets may safely descend to the ground.

14 Claims, 4 Drawing Sheets

AIRPLANE PASSENGER PARACHUTE SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of aircraft safety systems, more specifically, an airplane passenger parachute system.

SUMMARY OF INVENTION

The airplane passenger parachute system comprises an aircraft, a plurality of swing-up doors, a plurality of seat pallets, a plurality of tracks, and an activation control. The airplane passenger parachute system may be a safety feature adapted to evacuate a plurality of passengers from the aircraft after the aircraft has been determined to be unsafe to land. Responsive to actuating the activation control, the plurality of swing-up doors may open and the plurality of seat pallets comprising a plurality of passenger seats may be shifted from the aircraft by forcing the plurality of seat pallets out of the aircraft on the plurality of tracks. A parachute coupled to each of the plurality of seat pallets may deploy and the plurality of seat pallets may safely descend to the ground.

An object of the invention is to evacuate an aircraft by opening a plurality of swing-up doors on the side of the aircraft and by pushing a plurality of seat pallets comprising passenger seats out of the aircraft.

Another object of the invention is to provide an activation control that may be accessible to one or more pilots and that may be operable to initiate evacuation of the aircraft.

A further object of the invention is to provide a plurality of tracks that may guide the plurality of seat pallets laterally out of the aircraft.

Yet another object of the invention is to provide a mechanize shiftion system that may move the individual seat pallets laterally.

These together with additional objects, features and advantages of the airplane passenger parachute system will be readily apparent to those of ordinary skill in the art upon reading the following detailed description of the presently preferred, but nonetheless illustrative, embodiments when taken in conjunction with the accompanying drawings.

In this respect, before explaining the current embodiments of the airplane passenger parachute system in detail, it is to be understood that the airplane passenger parachute system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the airplane passenger parachute system.

It is therefore important that the claims be regarded as including such equivalent construction insofar as they do not depart from the spirit and scope of the airplane passenger parachute system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
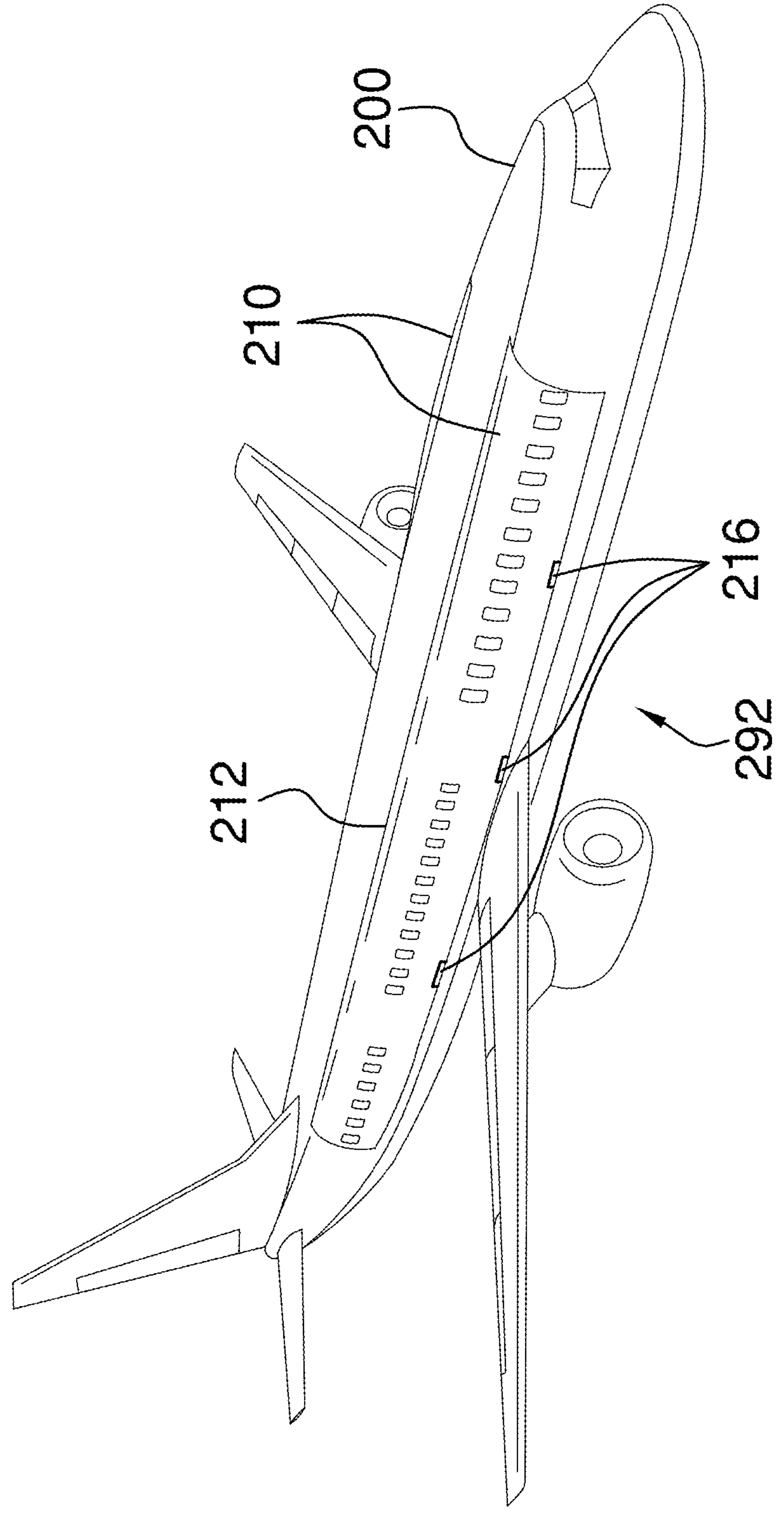
FIG. 1 is an isometric view of an embodiment of the disclosure, illustrating the plurality of swing-up doors in the closed position.
Figure 2:
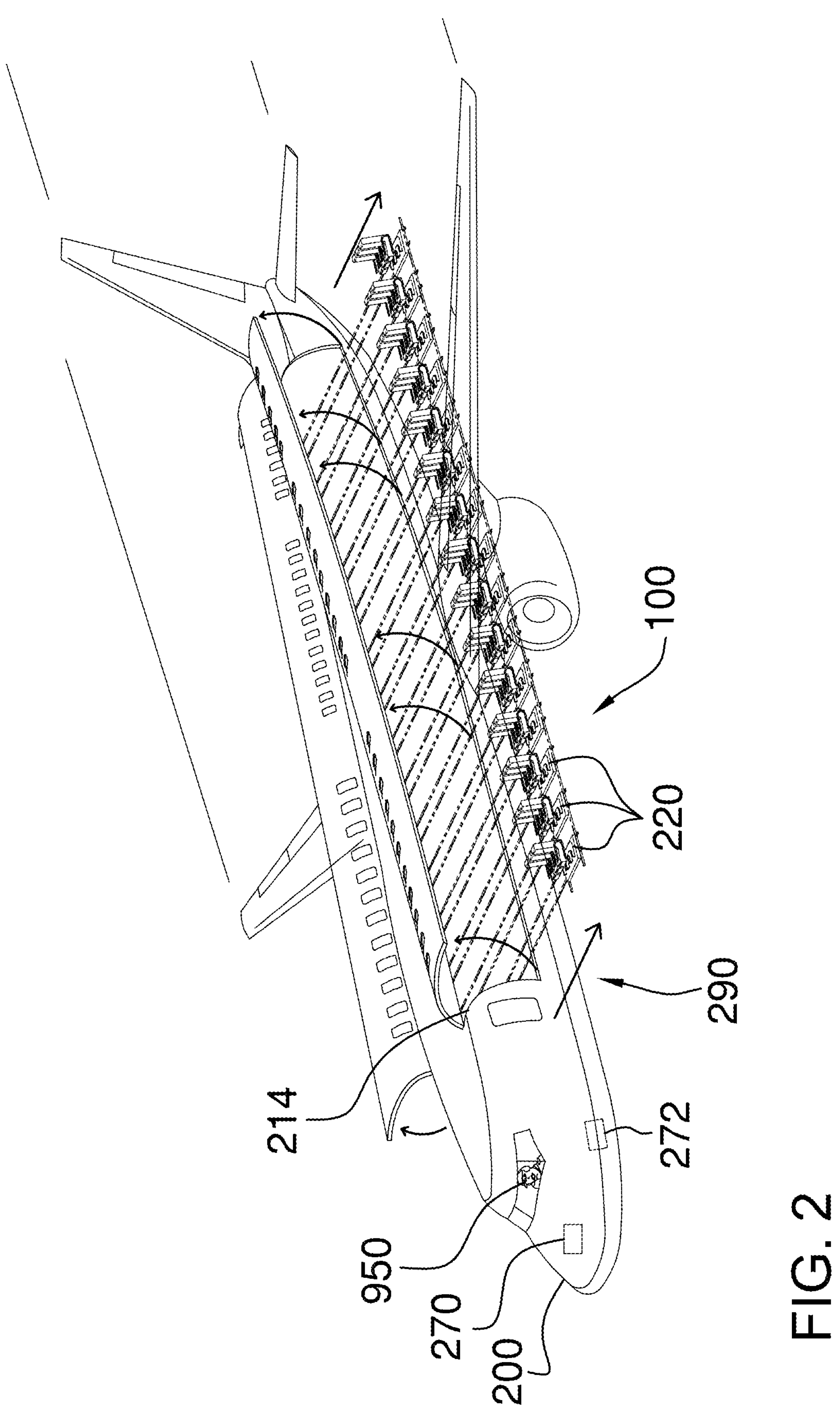
FIG. 2 is an in-use view of an embodiment of the disclosure, illustrating the plurality of swing-up doors in the closed position.
Figure 3:
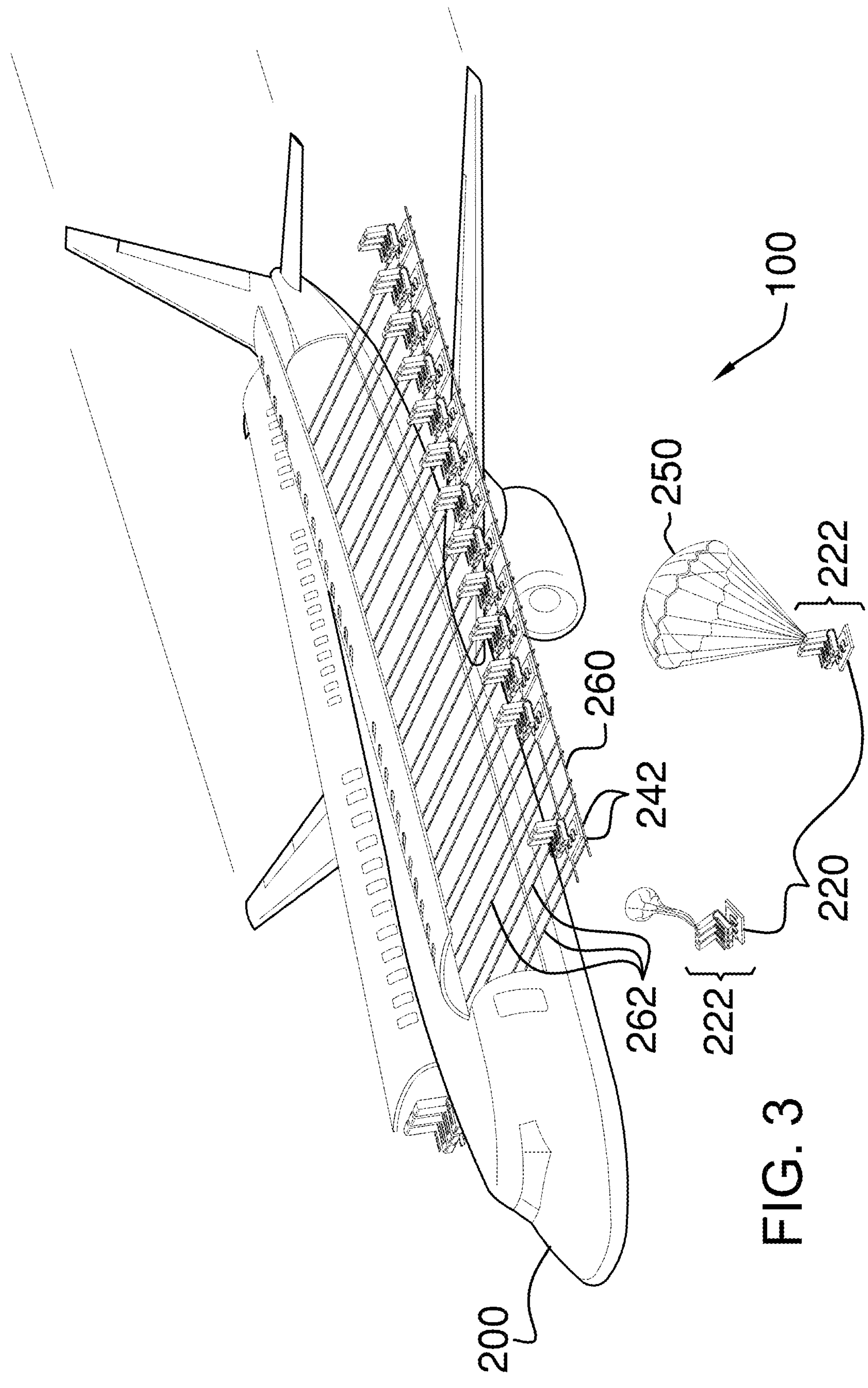
FIG. 3 is an in-use view of an embodiment of the disclosure, illustrating some tracks extended and some of the seat pallets forcing out of the aircraft.
Figure 4:
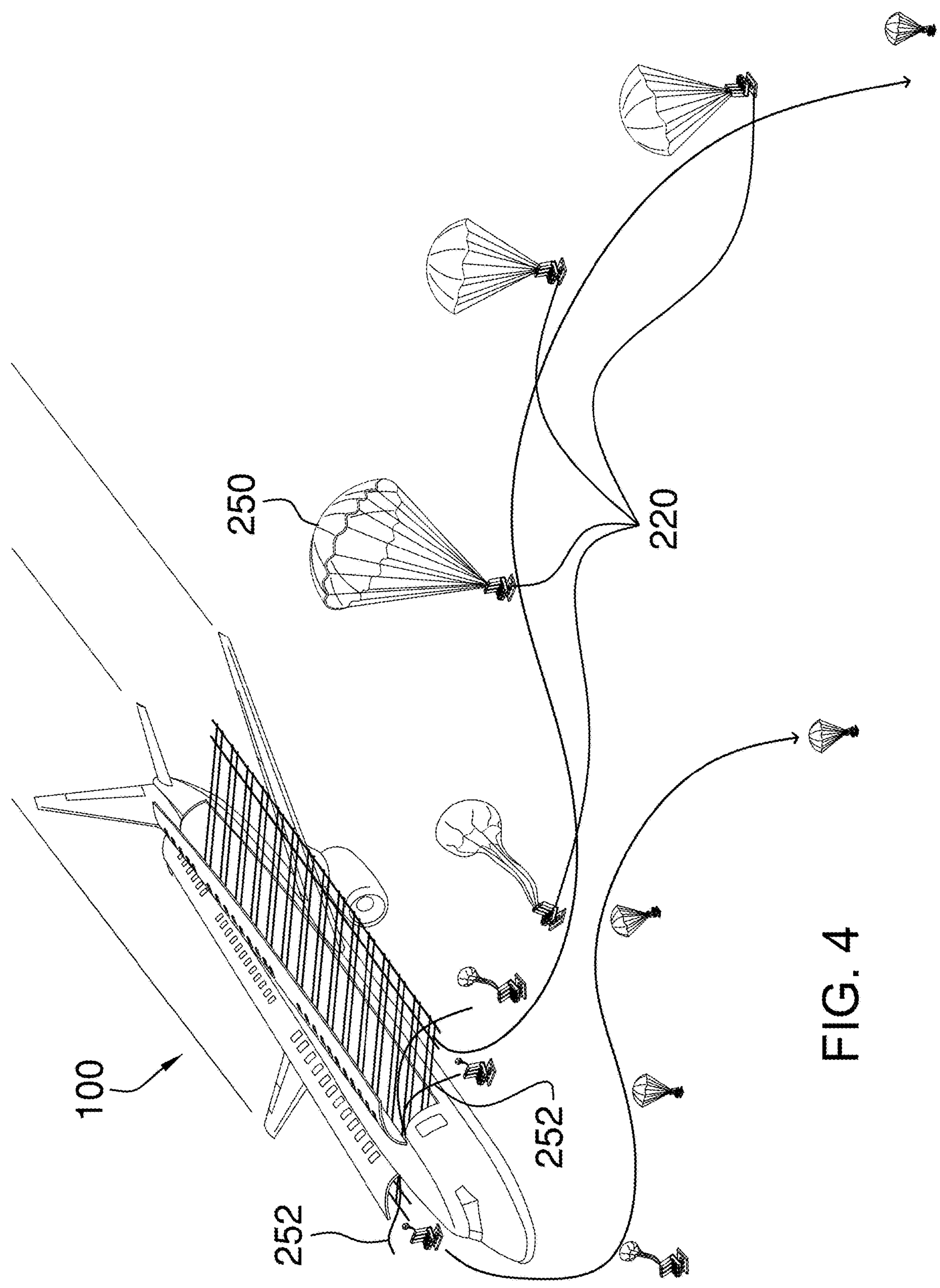
FIG. 4 is an in-use view of an embodiment of the disclosure, illustrating some seat pallets fully shifted and parachutes deployed.

Detailed reference will now be made to a first potential embodiment of the disclosure, which is illustrated in FIGS. 1 through 4.

The airplane passenger parachute system 100 (hereinafter invention) comprises an aircraft 200, a plurality of swing-up doors 210, a plurality of seat pallets 220, a plurality of tracks 260, and an activation control 270. The invention 100 may be a safety feature adapted to evacuate a plurality of passengers from the aircraft 200 after the aircraft 200 has been determined to be unsafe to land. Responsive to actuating the activation control 270, the plurality of swing-up doors 210 may open and the plurality of seat pallets 220 comprising a plurality of passenger seats 222 may be shifted from the aircraft 200 by forcing the plurality of seat pallets 220 out of the aircraft 200 on the plurality of tracks 260. A parachute 250 coupled to each of the plurality of seat pallets 220 may deploy and the plurality of seat pallets 220 may safely descend to the ground.

The aircraft 200 may be a commercial aircraft adapted to transport the plurality of passengers. The aircraft 200 may be adapted to be piloted by one or more pilots 950. The plurality of passengers may be adapted to sit in the plurality of passenger seats 222 that may be organized into a plurality of seat rows. In some embodiments, the plurality of seat rows may be separated into seat blocks by a center aisle. An individual seat block may comprise two or more adjacent seats coupled together and oriented laterally within the aircraft 200.

The plurality of swing-up doors 210 may be located on one or both side of the aircraft 200. An individual swing-up door selected from the plurality of swing-up doors 210 may be pivotably coupled to the aircraft 200 by a top hinge 212 and may be moved between a closed position 292 and an open position 290 by a pivot mechanism 214. One or more bottom latches 216 may retain the individual swing-up door in the closed position 292 during nominal flight.

The individual swing-up door may be associated with one or more of the plurality of seat pallets 220 such that the associated seat pallets may be shifted via the individual swing-up door when the individual swing-up door is in the open position 290.

An individual seat pallet may be coupled to the bottoms of the plurality of passenger seats 222 comprising one seat block. In a preferred embodiment, two or three passenger seats may be coupled to the individual seat pallet.

An individual passenger seat selected from the plurality of passenger seats 222 may comprise a seat harness. The seat harness may be adapted to fit an adult, a child, an infant, or a pet. An adult seat harness and a child seat harness may comprise at least a lap belt and a pair of shoulder belts. An infant seat harness may be oval-shaped and adapted to securely retain the infant to the front of the adult seat harness. A pet harness may be adapted to fit the legs and body of the pet and may secure to the individual seat pallet under the individual passenger seat.

The seat harness may comprise one or more buckles and one or more tension adjustments. The one or more buckles may be operable to open the seat harness for donning and removing. The one or more tension adjustments may be operable to adjust the fit of the seat harness.

The individual seat pallet may comprise a plurality of wheels 242. The plurality of wheels 242 may be oriented for lateral movement of the individual seat pallet over the plurality of tracks 260 that may be coupled to the aircraft 200.

In some embodiments, the individual seat pallet may comprise one or more flotation devices, one or more flares, a first aid kit, a GPS tracker, or any combination thereof. The GPS tracker, if present, may be activated automatically upon detection that the individual seat pallet has been shifted from the aircraft 200 and may transmit the location of the individual seat pallet.

The individual seat pallet may comprise the parachute 250. The parachute 250 may be deployed automatically as the individual seat pallet is shifted from the aircraft 200. As a non-limiting example, the parachute 250 may be deployed by a static line 252 coupled between the aircraft 200 and the parachute 250. The static line 252 may be operable to pull the parachute 250 during shiftion such that the parachute 250 may fill with air to lower the individual seat pallet.

The plurality of tracks 260 may be coupled to the aircraft 200 beneath the plurality of seat pallets 220. There may be two tracks per seat pallet. The plurality of tracks 260 may be oriented laterally and may guide movement of the plurality of seat pallets 220 towards the plurality of swing-up doors 210.

The invention 100 may comprise a mechanized shiftion system for forcing the plurality of seat pallets 220 out of the aircraft 200 on the plurality of tracks 260. As non-limiting examples, the mechanized shiftion system may comprise a plurality of linear actuators 262 to push the individual seat pallets, one or more of the plurality of wheels 242 on each of the plurality of seat pallets 220 may be motorized, or any combination thereof.

In some embodiments, the plurality of tracks 260 may be operable to extend outside of the aircraft 200 to increase the distance between the aircraft 200 and the individual seat pallets at the time that the individual seat pallets are dropped.

The activation control 270 may be located in the cockpit and may be adapted to be actuated by the one or more pilots 950. Responsive to actuation of the activation control 270, the plurality of swing-up doors 210 may be moved to the open position 290 and the mechanized shiftion system may be energized. The activation control 270 may control timing such that the plurality of seat pallets 220 may be shifted in a specific order with a time delay between each release in order to avoid collisions between the plurality of seat pallets 220. As non-limiting examples, the activation control 270 may comprise safety interlocks that prevent shiftion of the plurality of seat pallets 220 outside of a safe range of altitude, airspeed, and/or wind speeds.

In some embodiments, the invention 100 may further comprise an independent electrical generator 272. The independent electrical generator 272 may operate independent of the main electrical system of the aircraft 200 in order to assure that power may be available to shift the plurality of seat pallets 220 despite any damage that has contributed to disabling the aircraft 200.

In use, a plurality of passengers may board the aircraft 200, sit in the plurality of passenger seats 222, and fasten themselves in using harnesses. In the event that one or more pilots 950 declare that the aircraft 200 is disabled and that it is unsafe to attempt a landing, the one or more pilots 950 may actuate the activation control 270 to initiate an evacuation of the aircraft 200. Responsive to actuating the activation control 270:

An announcement may be made to inform the plurality of passengers of the situation and directing the plurality of passengers to fasten the harnesses.

Conditions such as altitude, airspeed, wind speed and direction, and others may be measured and compared to acceptable limits to determine if evacuation may be performed safely. If conditions are found to be unacceptable for an evacuation, this step may repeat until conditions become acceptable.

The plurality of swing-up doors 210 may be unlatched and moved from the closed position 292 to the open position 290.

The plurality of tracks 260 may be extended outside of the aircraft 200.

The mechanized shiftion system on each of the individual seat pallets may be energized to move the individual seat pallets along the plurality of tracks 260 in order to shift the plurality of seat pallets 220 from the aircraft 200. The plurality of seat pallets 220 may be shifted in row order with time delays between shiftions to prevent the individual seat pallets from striking each other.

As the individual seat pallets leave the aircraft 200, the parachutes 250 may be deployed and the GPS trackers may be activated.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "deploy" may refer to configuring a device to place the device into service or to make the device ready for service. As non-limiting examples, "deployed" may be synonymous with extended, unfolded, inflated, erected, or activated. As non-limiting examples, a device that is not deployed may be referred to as retracted, folded, deflated, withdrawn, collapsed, stowed, or deactivated.

As used herein, "front" may indicate the side of an object that is closest to a forward direction of travel under normal use of the object or the side or part of an object that normally presents itself to view or that is normally used first. "Rear" or "back" may refer to the side that is opposite the front.

In this disclosure, a "generator" may refer to a device that converts rotational mechanical energy into electric energy.

As used herein, "GPS" may refer to a device that uses signals received from a system of navigational satellites to determine the position of the device. GPS is an acronym for Global Positioning System.

As used in this disclosure, a "harness" may be an apparatus comprising a plurality of straps and one or more fasteners that is used to fasten or anchor a first person or first object to a second object. The phrase "N point harness" may refer to the installation of the harness wherein the harness has N anchor points. As a non-limiting example, a 2 point harness has two anchor points while a 5 point harness has 5 anchor points.

As used in this disclosure, a "hinge" may be a device that permits the turning, rotating, or pivoting of a first object relative to a second object.

As used in this disclosure, the word "lateral" may refer to the sides of an object or movement towards a side. Lateral directions are generally perpendicular to longitudinal directions. "Laterally" may refer to movement in a lateral direction.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, a "track" may be a device that is used to control the path of motion of an object in at least one dimension.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An airplane passenger parachute system comprising:

an aircraft, a plurality of swing-up doors, a plurality of seat pallets, a plurality of tracks, and an activation control;

wherein the airplane passenger parachute system is a safety feature adapted to evacuate a plurality of passengers from the aircraft after the aircraft has been determined to be unsafe to land;

wherein responsive to actuating the activation control, the plurality of swing-up doors open and the plurality of seat pallets comprising a plurality of passenger seats are shifted from the aircraft by forcing the plurality of seat pallets out of the aircraft on the plurality of tracks;

wherein a parachute coupled to each of the plurality of seat pallets deploys and the plurality of seat pallets descend to the ground;

wherein an individual swing-up door of the plurality of swing-up doors is associated with one or more of the plurality of seat pallets such that the associated seat pallets are shifted when the individual swing-up door is in the open position;

wherein the plurality of tracks are operable to extend outside of the aircraft to increase a distance between the aircraft and an individual seat pallet of the plurality of seat pallets when that the individual seat pallets are dropped.

2. The airplane passenger parachute system according to claim 1, wherein the aircraft is a commercial aircraft adapted to transport the plurality of passengers;

wherein the aircraft is adapted to be piloted by one or more pilots;

wherein the plurality of passengers are adapted to sit in the plurality of passenger seats that are organized into a plurality of seat rows.

3. The airplane passenger parachute system according to claim 2, wherein the plurality of seat rows are separated into seat blocks by a center aisle;

wherein an individual seat block comprises two or more adjacent seats coupled together and oriented laterally within the aircraft.

4. The airplane passenger parachute system according to claim 3, wherein the plurality of swing-up doors are located on one or both side of the aircraft;

wherein the individual swing-up door selected from the plurality of swing-up doors is pivotably coupled to the aircraft by a top hinge and is moved between a closed position and an open position by a pivot mechanism;

wherein one or more bottom latches retain the individual swing-up door in the closed position during nominal flight.

5. The airplane passenger parachute system according to claim 4, wherein the individual seat pallet is coupled to the bottoms of the plurality of passenger seats comprising one seat block.

6. The airplane passenger parachute system according to claim 5, wherein two or three passenger seats are coupled to the individual seat pallet.

7. The airplane passenger parachute system according to claim 6, wherein the individual seat pallet comprises a plurality of wheels;

wherein the plurality of wheels are oriented for lateral movement of the individual seat pallet over the plurality of tracks that are coupled to the aircraft.

8. The airplane passenger parachute system according to claim 6, wherein the individual seat pallet comprises the parachute;

wherein the parachute is deployed automatically as the individual seat pallet is shifted from the aircraft.

9. The airplane passenger parachute system according to claim 8, wherein the parachute is deployed by a static line coupled between the aircraft and the parachute;

wherein the static line is operable to pull the parachute during shiftion such that the parachute fills with air to lower the individual seat pallet.

10. The airplane passenger parachute system according to claim 8, wherein the plurality of tracks are coupled to the aircraft beneath the plurality of seat pallets;

wherein there are two tracks per seat pallet;

wherein the plurality of tracks are oriented laterally and guide movement of the plurality of seat pallets towards the plurality of swing-up doors.

11. The airplane passenger parachute system according to claim 10, wherein a plurality of linear actuators push the individual seat pallets, one or more of the plurality of wheels on each of the plurality of seat pallets are motorized, in order to push the individual seat pallet out of the aircraft on the plurality of tracks.

12. The airplane passenger parachute system according to claim 11, wherein the activation control is located in the cockpit and is adapted to be actuated by the one or more pilots;

wherein responsive to actuation of the activation control, the plurality of swing-up doors is moved to the open position and the mechanized shiftion system is energized.

13. The airplane passenger parachute system according to claim 12, wherein the activation control controls timing such that the plurality of seat pallets are shifted in a specific order with a time delay between each release in order to avoid collisions between the plurality of seat pallets.

14. The airplane passenger parachute system according to claim 13, wherein the airplane passenger parachute system further comprises an independent electrical generator;

wherein the independent electrical generator is provided on operates independent of the main electrical system of the aircraft in order to assure that power is available to shift the plurality of seat pallets despite any damage that has contributed to disabling the aircraft.

* * * * *